(12) United States Patent
Pepper

(10) Patent No.: US 12,080,986 B2
(45) Date of Patent: Sep. 3, 2024

(54) SPECTRALLY AND SPATIALLY DISTRIBUTED PHASE-CONJUGATE, LONG-LASER RESONATOR

(71) Applicant: David M Pepper, Camarillo, CA (US)

(72) Inventor: David M Pepper, Camarillo, CA (US)

(73) Assignee: David M. Pepper, Camarillo, CA (US)

( * ) Notice: Subject to any disclaimer, the term of this patent is extended or adjusted under 35 U.S.C. 154(b) by 290 days.

(21) Appl. No.: 17/566,327

(22) Filed: Dec. 30, 2021

(65) Prior Publication Data

US 2023/0216266 A1  Jul. 6, 2023

(51) Int. Cl.
  *H01S 3/10* (2006.01)
  *H01S 3/08* (2023.01)
  *H04B 10/11* (2013.01)

(52) U.S. Cl.
  CPC ...... *H01S 3/10076* (2013.01); *H01S 3/08059* (2013.01); *H04B 10/11* (2013.01)

(58) Field of Classification Search
  CPC ............. H01S 3/10076; H01S 3/08059; H01S 3/2325; H04B 10/11
  USPC ........................................................ 398/118
  See application file for complete search history.

(56) References Cited

U.S. PATENT DOCUMENTS

| 4,209,689 A | 6/1980 | Linford et al. |
| 4,233,571 A | 11/1980 | Wang et al. |
| 6,115,123 A | 9/2000 | Stappaerts et al. |
| 6,872,960 B2 | 3/2005 | Pepper et al. |
| 8,175,125 B2 * | 5/2012 | Eichhorn ............ H01S 3/08059 372/71 |
| 9,905,988 B2 | 2/2018 | Della-Pergola et al. |
| 2023/0236455 A1 * | 7/2023 | Pepper .............. G02F 1/133528 359/291 |

FOREIGN PATENT DOCUMENTS

| WO | WO 2007/036937 A3 | 4/2007 | |
| WO | WO-2007081939 A2 * | 7/2007 | ............... G02F 1/09 |
| WO | WO 2009/083990 A3 | 7/2009 | |

OTHER PUBLICATIONS

U.S. Appl. No. 17/643,348, filed Dec. 8, 2021, Pepper.
(Continued)

*Primary Examiner* — Mohammad R Sedighian

(57) ABSTRACT

A spatially and spectrally distributed long-laser system. Spatially separated phase-conjugate mirrors (PCMs) define a long-laser resonator cavity. The PCMs define, respectively, a power transmitting unit (master), and a power receiving unit (slave), as well as providing a secure two-way communications link between the units. The long-laser is mode-locked, minimizing third-party interception and detection. A wavefront-reversal device, using a MEMS spatial phase modulator, integrated with a retroreflector array, provides a true phase-conjugate (time-reversed) replica of the beam at each end of the system, providing auto-alignment, diffraction-limited performance, compensation for static and dynamic phase and polarization distortions, minimizing the FOV and scattering. The retroreflecting array initiates the oscillation mode. The SPM adaptive optical system bootstraps the retro-array by forming a simultaneous closed-loop system. The PCM emulates a deformable mirror with an integrated cat's eye retro-array, on a pixel-by-pixel basis, equivalent to a true wave-front reversal device at each end of the system.

20 Claims, 8 Drawing Sheets

(56) References Cited

OTHER PUBLICATIONS

Linford, "Very long lasers," Appl. Opt., vol. 13, pp. 379-390, 1974.
Linford, "Nd: YAG long lasers," Appl. Opt., vol. 13, pp. 1387-1394, 1974.
Vanherzeele, "Mode-locked laser oscillation using self-pumped phase- conjugate reflection," Opt. Lett., vol. 6, pp. 467-469, 1981.
Gray, "Mode locking in semiconductor lasers by phase-conjugate optical feedback," Opt. Lett., vol. 20, pp. 1295-1297, 1995.

* cited by examiner

SPECTRALLY AND SPATIALLY DISTRIBUTED PHASE-CONJUGATE, LONG-LASER RESONATOR

FIELD OF THE INVENTION

The present invention relates to the field of long lasers and distributed laser resonators using retroreflectors and phase conjugate mirrors and, more specifically to long resonator, mode-locked phase-conjugate lasers for wireless transmission of laser power and secure communications to portable opto-electronic devices.

DESCRIPTION OF RELATED ART

The related art pertains to long laser systems for secure communications, and to spatially distributed laser resonators for remote powering of portable devices. The related art also pertains to mode-locked lasers and phase conjugate laser systems. This art may be of interest to the reader when reviewing this description of the present technology.

Long laser systems have been investigated over 40 years ago, with application to secure communications, remote sensing and remote powering. These systems typically involve long laser cavities over 10s of meters to many kilometers in length, with single retroreflector elements placed at one or both ends of the cavity. Early investigations and demonstrations involved the use of xenon as well as Nd:YAG laser gain media as the active element in the resonator, and, involved the use of corner cube retroreflectors to complete the laser resonator, with intracavity telescopes to define the field of view of the systems. FIG. 1A shows an example of the known art 100. A long laser cavity is formed by a single retroreflecting corner cube at each end of the cavity 10, each with detection and modulation capabilities. Within the long cavity is a gain medium 11 and a telescope 12, the latter of which defines the field of view (FOV) of the system. The long laser is comprised of a master transceiver 50 and a slave transceiver 60. Once above threshold for oscillation, laser action will commence between the ends of the cavity. Signals can then be communicated between the master and slave transceivers, as shown in the figure. The long laser compensates for tilt errors and beam wander (only the lowest odd-order phase error) but does not compensate for higher order odd or even path errors such as focus errors, atmospheric turbulence and thermally induced propagation errors, rendering this approach impractical in many application scenarios.

Moreover, these systems are not secure in that a third party can impose a retroreflector in the field of view of the extended cavity and, if the threshold condition is met, undesirable laser oscillation can commence between the third party retroreflector and the master laser transceiver module. The known art does not address this downside. Furthermore, in the early art, no provision for optical power transmission from the master to the slave modules is taught.

In the more recent art, as shown in FIG. 1B, a spatially distributed laser resonator was taught 150, which is comprised of a master power laser transceiver and multiple laser (slave) receivers, each equipped with a single retroreflector element, which can be remotely powered by a master power transceiver. The master laser transceiver 160 ($T_x$) is comprised of an iris 103, a gain medium 104, a telescope 106 and a retroreflector 105. The telescope defines a field of view of the laser resonator. The slave receivers 101 and 102 ($R_{x1}$ and $R_{x2}$, respectively) are each comprised of a single retroreflector element (a cat's eye retroreflector) and a photovoltaic detector which, when above the laser oscillation threshold with the master transceiver, can derive optical power from the baseline master laser transceiver.

As before, it has been shown that an isolated retroreflector compensates for tilt errors (relative platform motion, beam wander), but does not compensate for all even and other odd orders of phase or wavefront errors. Hence, this prior art is limited to tilt error compensation and not to general wavefront errors such as atmospheric and underwater propagation errors, turbulence, turbid media, laser gain media distortions and guided-wave structure modal dispersion. This shortcoming renders the prior-art approach impractical under these real-world conditions.

Moreover, the security of this system is limited in that third party retroreflectors within the FOV of the system can intercept power from the master laser transceiver. As before, the prior art does not address this major drawback. Furthermore, no provision for secure laser communication amongst the cavity modules is taught.

Hence, the prior art is limited in its security capabilities, including third party interception, detection, as well as secure optical communication and power transfer. In these systems, an undesirable target within the FOV can still result in undesirable energy deposition onto it and/or communication with it, instead of the desired target.

Another drawback of the prior art in long lasers and spatially distributed resonators is that retroreflectors do not yield a diffraction-limited link. The action of a retroreflector is to compensate for beam wander, relative platform motion and tilt errors. However, they do not result in a diffraction limited beam to be formed within the long resonator. One result of this drawback is that the FOV is not minimized, so that the system is more readily exposed to third party interception, as well as undesirable scattering of the cavity mode.

In the present invention, one or both of the cavity reflectors is in the form of a phase-conjugate mirror (PCM) instead of a corner cube or cat's eye retroreflector. The presence of a PCM assures diffraction-limited beam formation within the resonator cavity the of the system, minimizing the FOV, thereby lowering the probability of interception, as well as minimizing scattering, thereby lowering the probability of detection. The PCM can be configured to compensate for depolarization effects using techniques known in the art.

Phase-conjugate systems in the prior art enable the formation of diffraction-limited illumination and directed energy transfer to a glint feature, which can be in the form of a retroreflector within the field of view (FOV) of the system. Examples of known-art applications that utilize phase conjugation to this end include inertial confinement systems, laser countermeasure systems, directed energy systems and industrial applications, the latter that require precision laser machining or lithography.

However, such phase conjugate or adaptive optical systems do not distinguish between a desired target and an undesirable object to illuminate. That is, other dominate glint reflections in the FOV can result in the directed energy beam illuminating it as opposed to a desired target within the FOV, the latter of which may not necessarily possess a dominate glint return beam.

Moreover, in these prior art systems, a separate, cooperative, stand-alone illumination laser is required to establish a link between the adaptive optical processor and the target. The presence of a laser illuminator is undesirable in that it adds complexity to the system and reveals the location of the laser illuminator and, in some cases, also the location of the laser power transmitter. The requirement of an illumination laser defeats the purpose and intent of the present invention. That is, the present invention teaches against the use of such an illumination laser, nor is such an auxiliary laser desirable.

The prior art teaches a laser resonator, comprised of a phase-conjugate mirror (PCM) on one end of a cavity to compensate for intracavity distortions, such as laser amplifier aberrations. However, this approach involves the use of a nonlinear medium as the phase-conjugate mirror (stimulated Brillouin scattering [SBS], three-wave mixing [TWM], four-wave mixing [FWM], photon echoes [PE], etc.). In some embodiments, an auxiliary laser is required to initiate the process (TWM, FWM, PE), which is highly undesirable in the present invention. In other cases, a nonlinear threshold condition must be satisfied for the PCM to function (SBS), which is also highly undesirable. In the present invention, the laser resonator is self-starting and does not require a stand-alone laser to initiate the laser action. In the prior art, the intracavity laser mode is frequency shifted (e.g., using a SBS interaction), which defeats the mode-locking aspect of the present invention. In addition, in some cases, the prior art involves a PCM using an atomic or molecular resonance medium, thereby resulting in a narrowband system. A narrowband PCM defeats the mode-locking characteristic of the present invention, limiting the pulse parameters and the laser cavity power. In the present invention, there is no frequency shifting involved. Moreover, the phase-conjugate mirror in the present case is a broadband linear device, does not involve any frequency shifts and does not require a nonlinear threshold condition to function.

FIG. 2 shows a recent prior art example of a phase-conjugate mirror (PCM) 200, which is comprised of a MEMS spatial phase modulator (SPM), integrated with a passive retroreflecting array. This class of PCM is utilized in a preferred embodiment of the present invention. The SPM is comprised of an array of piston (204) driven mirror segments 203, each coated with a thin film of metallization or dielectric. The input port of the device is comprised of a pair of subwavelength metasurfaces or subwavelength diffractive optical elements 202. Each pair of subwavelength structures, 202, in conjunction with the respective reflective surface of the mirror element, 203, form a cat's eye retroreflector over each pixel of the device. Each MEMS mirror element, in turn, is longitudinally controlled by placing a voltage across each pixel 205, thereby controlling the phase of an incident beamlet 201, which is assumed to be comprised of a piecewise set of plane waves, as illustrated by 401. The result of this operation is that each beamlet 201 (plane wave element 401) is retroreflected and phase controlled on a pixel-by-pixel basis.

When configured in a servo-controlled closed-loop adaptive optics system (discussed below with respect to FIG. 4), the resultant phase conjugate mirror (PCM) does not require a threshold condition to be met, does not result in a wavelength-shifted return, nor does it require coherent pump beams to initiate wavefront reversal.

In an exemplary embodiment of this invention, during operation, this PCM enables long laser cavity oscillation to commence using the passive retroreflecting property of the device, followed by a bootstrapping of the spatial phase modulator in a closed-loop servo-controlled configuration, to initiate true wavefront reversal, as shown below (schematically) in FIG. 5.

A unique feature of this class of PCM is that a retroreflecting array (a pseudoconjugator) is involved in the initiation of a phase-conjugate long-laser oscillation, as opposed to an isolated single retroreflector of the known art. (Recall, that the PCM is comprised of a SPM integrated with a retroreflecting array.) The presence of an array of retroreflectors enables compensation for odd-order phase error beyond the lowest odd-order phase error (tilt). This feature results in a lower threshold condition and reduced optical scattering as the overall closed-loop PCM servo converges. Once initiated, a bootstrapping modality is realized as the closed-loop servo system simultaneously configures the multi-pixel, phase-shifting array of the spatial phase modulator (SPM) of the PCM in the presence of the passive retroreflector array. This approach—a closed-loop SPM adaptive optical system integrated with a passive pseudo-conjugator—has not been considered or anticipated by those skilled in the art.

Mode-locked laser systems have been in existence for over 40 years, with application to laser spectroscopy, medical and industrial applications and communication systems. Myriad techniques have been employed to phase lock the longitudinal modes of a laser, including passive and active techniques. In the former case, a saturable medium is placed in a cavity. In the latter case, active mode-locking techniques include intracavity gain switching, as well as PM or AM intracavity modulation. Most mode-locked systems involve ring resonators, including laser gyroscopes. Ring resonators are not amenable to the present invention; linear cavity configurations are required.

Phase conjugation techniques have been employed to realize and/or augment mode-locked lasers, with application to cavity stability and compensation for intracavity distortions. However, in the known art, an existing, stand-along oscillating mode-locked laser is required to provide a functional laser output to initialize the phase-conjugate return, which is highly undesirable in the present case. In a different case, a cooperative phase conjugator at the receiving location using the laser transmitter to initialize it is required, which is also highly undesirable. In the present invention, mode-locked laser oscillation requires a cooperative master transceiver and slave transceiver to initiate laser action; no initiation laser is required or desirable.

In addition, a long-laser system that employs mode-locking to initiate the process has not been considered. Furthermore, mode-locking of multiple laser cavities, each with a different intracavity modulation frequency, that also involves phase conjugation (without the need for a threshold condition to be met or coherent pump waves to be present), has not been considered. Moreover, a mode-locked laser with a pair of intracavity modulators (one at each end of the cavity), and modulating at one-half the round-trip time, has not been discussed in the literature. Finally, a phase-conjugate mirror that employs a passive retroreflecting array to initiate long-resonator oscillation—after which a true wavefront reversal function is realized—has not been considered. A true wavefront reversal function enhances the performance of the system and minimizes undesirable scattering of the phase-conjugate beam. These considerations, which are not anticipated or obvious, are described with respect to the exemplary embodiments of the present invention.

Hence, there exists a need for a secure spatially and spectrally distributed long laser cavity architecture, which overcomes at least some of the above-mentioned disadvantages and limitations of prior art systems and methods.

The aforementioned state-of-the-art in distributed laser cavities, long lasers, phase-conjugate systems and mode-locked lasers includes, for example, (i) U.S. Pat. No. 4,209,689, entitled "Laser secure communications system," (ii) U.S. Pat. No. 4,233,571, entitled "Laser having a nonlinear phase conjugating reflector," (iii) U.S. Pat. No. 6,115,123, entitled "Holographic laser aimpoint selection and maintenance," (iv) U.S. Pat. No. 6,872,960, entitled "Robust infrared countermeasure system and method," (v) U.S. Pat. No. 9,905,988, entitled "Spatially distributed laser resonator," (vi) U.S. patent application Ser. No. 17/643,348, entitled "Wavefront reversal device using a MEMS spatial phase modulator integrated with a retroreflector array," (vii) WO 2007/036937 A3, entitled "Directional light transmitter and receiver," (viii) WO 2009/083990 A3, entitled "Wireless laser power transmitter," (ix) G. J. Linford, et al., "Very long lasers," Appl. Opt., vol. 13, pp. 379-390 (1974), (x) G. J. Linford, et al., "Nd:YAG long lasers," Appl. Opt., vol. 13, pp. 1387-1394 (1974), (xi) Vanherzeele, et al., "Mode-locked laser oscillation using self-pumped phase-conjugate reflection," Opt. Lett., vol. 6, pp. 467-469 (1981), and (xii) Gray, et al., "Mode locking in semiconductor lasers by phase-conjugate optical feedback," Opt. Lett., vol. 20, pp. 1295-1297 (1995).

The disclosures of each of the publications mentioned in this section and in other sections of the specification are hereby incorporated by reference, each in its entirety.

SUMMARY OF THE INVENTION

It is an attempt in creating the present invention to establish a communications link between a master laser amplifier transceiver module and a slave laser transceiver module within the field of view (FOV) of the system to relay power or to communication with the slave laser module over a secure link. The present invention provides for this secure communications link by selective laser oscillation between the master laser power module and the slave receiver module of choice via selective mode-locked operation so that only the receiver of choice participates in the mode-locked process (the conditions for mode-locking are highly dependent on the modulation frequency and the range, or distance, between the modules).

It is a further attempt in creating the present invention to provide link security between the maser and slave modules so that third party detection and interception are minimized. This is accomplished by establishing a long laser cavity between the laser transmitter module and the slave receiver of choice over a relatively narrow field of view. This architecture obviates the need for a laser illuminator to initially locate the position of the slave receiver and, thus avoid revealing the presence of either the laser power transmitter and/or the slave laser receiver. Thus, laser oscillation only proceeds once the link is established by external means. In one embodiment, a broadband, yet encrypted, rf link provides unique information (such as mode-locked frequency and range parameters), with handshake initiation, between both ends of the link to initiate mode-locked oscillation.

It is yet a further attempt in creating the present invention to establish the desired link over path distortions, including, but not limited to, atmospheric turbulence, laser amplifier distortions, underwater turbidity, modal dispersion in guided-wave structures, relative platform motion, beam wander, patient motion (in medical applications), and vibrations (due to industrial environments and airborne mechanical vibrations).

The prior art in long lasers involves single retroreflectors, such as corner cubes and cat's eye retroreflectors and, as such, only compensates for relative platform motion and tilt errors. The present invention establishes a communications channel in the face of all even and odd orders of wavefront phase errors (within the FOV of the system). This is accomplished by utilizing phase-conjugate mirrors at one or both ends of the link.

In one embodiment of the present invention, a unique class of PCM is utilized that combines a passive retroreflective array (otherwise known as a pseudoconjugator) with an active spatial phase control, the latter using a spatial light modulator (SLM), configured as a spatial phase modulator (SPM), with wavefront phase-control capability. In this case, the passive retroreflection establishes the initial communications channel—as in the prior art of long-laser cavities, but, now, with a retroreflecting array instead of a single corner cube. The present invention configures the retroreflector array so that it is then "bootstrapped" with the adaptive optical, closed-loop spatial phase modulator property of the SLM for enhanced signal-to-noise link operation. This device is comprised of a phase-only MEMS spatial light modulator (SLM) array, known as a spatial phase modulator (SPM), integrated with a specific class of pseudoconjugator (a cat's eye retroreflective array), all on a pixel-by-pixel basis. That is, the device involves one cat's-eye retro reflector integrated with each phase-only MEMS SLM pixel—resulting in an array of such compensated pixels, all in a compact, planar, lightweight device. This PCM does not require coherent pump beams to function, does not require a threshold condition to operate and does not result in frequency-shifted reversed wavefronts. The composite device performs the operation of a "true" phase-conjugation (true "time reversal") of the wavefronts of an incident optical beam.

It is to be appreciated that the specific PCM employed in the present invention is unique: The PCM is comprised of a passive retroreflecting array (pseudoconjugator), integrated with a closed-loop adaptive optical spatial phase modulator, SPM. Every individual retroreflector in the array is associated with an individual optical phase shifting control element.

The passive pseudoconjugator of the PCM initiates laser oscillation basically at the speed of light through the system. Thus, even prior to the closed-loop system converging, laser oscillation is realized, which is key to the functionality of the system. Once laser oscillation has begun, then the closed-loop adaptive optical system (via the SPM) initiates convergence of resulting in a "true" phase-conjugate beam in real time. Hence, a "bootstrapping" operation is realized. The pseudoconjugator functions, as the closed-loop adaptive optical processor converges. Once converged, the true phase-conjugate beam then improves the efficiency of the system, narrows the FOV and minimizes undesirable scattering. It is this unique combination of PCM operations—simultaneous passive pseudoconjugation and closed-loop adaptive optical wavefront reversal—without a nonlinear threshold condition to be met, without frequency shifts and without an auxiliary (pump) laser required—that enables this system to function at a high level of stability, low threshold and robustness. These functionalities in a single PCM, as well as a phase-conjugate laser resonator, are not obvious nor are anticipated by those skilled in the art. The PCM can also be configured to compensate for depolarization effects using techniques known in the art.

Also note that, in addition to the reduced FOV resulting from the PCMs that comprise the laser resonator, the present invention overcomes the prior art limitations of the probability of interception and detection by employing a set of two or more parallel, mode-locked, phase-conjugate resonators, each with a different intracavity precise required modulation frequency. That is a third party would necessarily have to be situated within the narrow FOV of the system, and, additionally, be positioned at the precise range for mode-locking to occur (and, in a further embodiment, also possess a modulator at the precise frequency for mode-locking at a single-pass inverse transit time, which is not typical of mode-locked systems).

The system is configured as a two-way communications link or power transmission channel, with a master power laser amplifier transceiver module at one end of the link and one of a set of slave laser transceiver modules at the second end of the link.

The goal of this system is six-fold: (1) to deliver optical power from the master module to one or more of the slave modules, one slave module at a time; (2) to exchange intelligence information from the master module to one of more slave modules; (3) to perform this operation at long ranges (10s of meters to kms); (4) to compensate for propagation distortions beyond tilt errors (turbulent atmospheres, turbid water, guided-wave structures, laser amplifier aberrations, thermal distortions, etc.), as well as to compensate for depolarization effects; (5) to minimize the FOV and the optical scattering of the system; and (6) to realize these operations in a secure manner, minimizing the probability of detection and interception, even if the third party interrogator is within the FOV of the system.

The components of the system employ a master laser power amplifier transceiver module—comprised of a laser power amplifier or amplifiers, a phase-conjugate mirror, and a modulator and demodulator—and a spatially and spectrally distributed set of slave transceiver modules—each slave module comprised of a phase-conjugate mirror, a modulator and demodulator, a photovoltaic detector and an optional laser pre-amplifier. A rf transceiver placed at each end of the link provides secure link information—such as mode-locked frequency information and range information—to initiate a secure optical communications channel and a secure optical power transfer operation of choice.

The laser master module can service any of the slave transceiver modules, as determined via mode-locked frequency selectivity, so long as the desired slave receiver is within the field of view of the master laser module and the modulation frequency is correctly and precisely set (for a given range). These necessary requirements add to the security and selectivity of the present invention.

Two unique properties of the present invention minimize the probability of third party interference, detection and interception. The first feature of the present invention is that one or both ends of the link employ phase-conjugate mirrors, PCMs. This guarantees that a diffraction-limited beam will connect the ends of the link, minimizing the FOV of the system, as well as minimizing undesirable scattering. Recall that the prior art utilizes conventional retroreflectors (single corner cube reflectors or cat's eye retros) at both ends of the link. This limits the performance of the system in that a diffraction-limited beam is not realized. Hence, the FOV for the system is not minimized, and, moreover, deleterious off axis scattering is possible, as well as the inability of the system to compensate for path distortions other than tilt, beam wander or relative platform motion. Specifically, higher order aberrations such as atmospheric turbulence, scattering due to turbid liquids, laser amplifier distortions, thermal aberrations, etc. are not compensated via the use of single retroreflector elements. On the other hand, phase-conjugate mirrors at one or both end of the link assures compensation for these deleterious distortions, within the FOV of the system (which is fundamentally minimized).

Another feature of the present invention that improves the security of the system in the face of third parties is the fact that the link is mode-locked during operation. Mode-locking of a laser is based critically on the distance between the end points of the cavity and on the precise intracavity AM or PM modulation frequencies. Hence, unless a third party is privy to this precise frequency and precise range of operation, the probability of interception is greatly reduced.

To further enhance the security of the system, a second, unique mode-locking modality is implemented, that of placing a modulator at each end of the cavity and applying a modulation frequency with a period equal to one-half the round-trip cavity time (typical mode-locked laser employ a single modulator at a frequency with a period equal to the round-trip time of the cavity mode).

The combination of these two factors—phase-conjugate operation (with a retroreflective array for initiation) and mode-locking—dramatically improve the security of the long laser system to undesirable third party interception and interference, which is not anticipated or obvious in the known art. These conditions enable secure and efficient and secure power transfer from the power laser master module to the slave module as well as establishing a secure and efficient communications channel amongst the modules.

As an example, even if a third party is within the (minimal) FOV of the system, it will not be able to intercept the communications channel information or derive optical power from the master laser transceiver, since it must also have precise information as to the mode-locked parameters of the system, which is highly precise in frequency and range of the basic communications link, and, which can be modified by the rf link that exchanges information between the master and slave modules. Finally, the prior art does not employ a closed-loop adaptive optical system, integrated with a retroreflecting array on a pixel-by-pixel basis to realize a long laser resonator.

In summary, spatially separated phase-conjugate mirrors (PCMs) define a long-laser resonator cavity. The PCMs define, respectively, a secure power transmitting unit (master), and a power receiving unit (slave), as well as providing a secure two-way communications link between the units. The long-laser is mode-locked, minimizing third-party interception and detection. A wavefront-reversal device, using a MEMS spatial phase modulator, integrated with a retroreflector array, provides a true phase-conjugate (time-reversed) replica of the beam at each end of the system, providing auto-alignment, diffraction-limited performance, compensation for static and dynamic phase and polarization distortions, minimizing the FOV and scattering losses. The retroreflecting array initiates the oscillation mode. The SPM adaptive optical system bootstraps the retro array by forming a simultaneous closed-loop system. The PCM emulates a deformable mirror with an integrated cat's eye retro array, on a pixel-by-pixel basis, equivalent to a true wave-front reversal device at each end of the system.

BRIEF DESCRIPTION OF THE DRAWINGS

The accompanying drawings, which are incorporated into and form a part of the disclosure, are only illustrative embodiments of the invention serve to better understand the principles of the invention in conjunction with this description.

DETAILED DESCRIPTION OF THE INVENTION

Figure 1A:
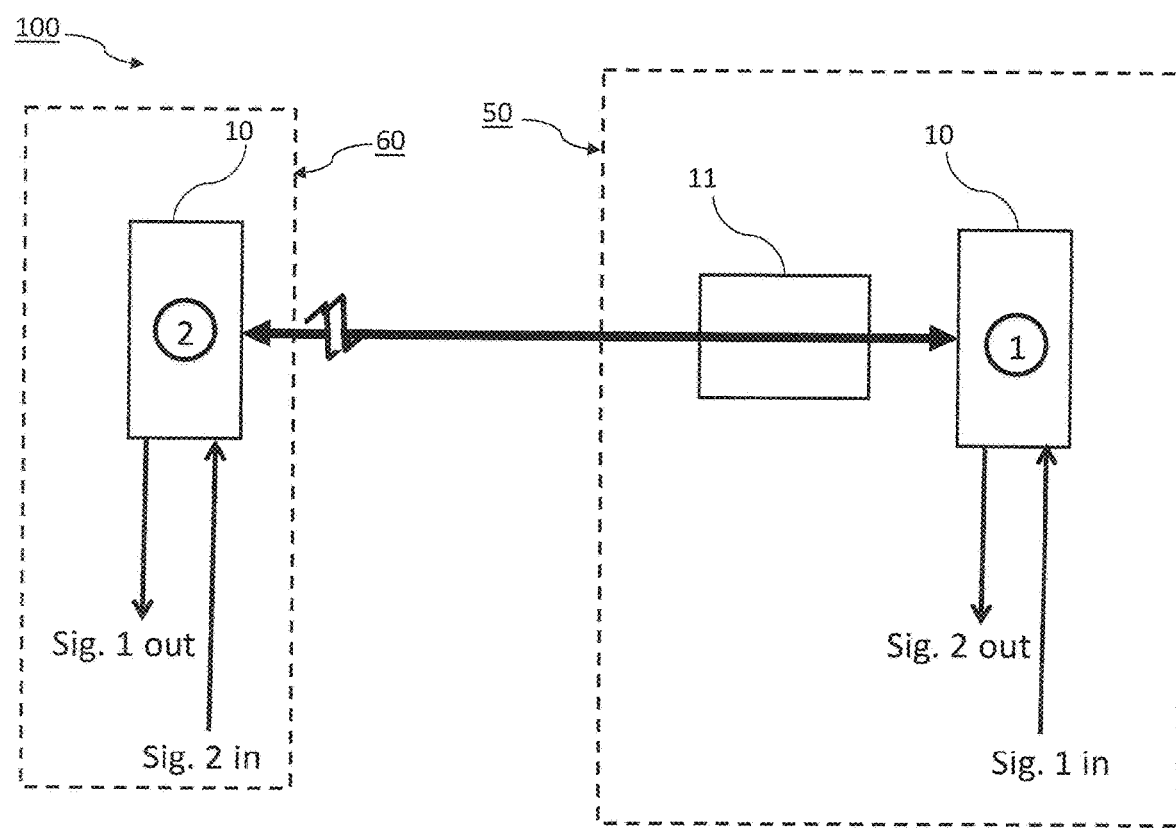
FIG. 1A shows a prior art, long laser device comprised of a pair of single retroreflector elements (i.e., not a retroreflector) array that defines a long laser cavity communications system, with an intracavity gain medium and an intracavity telescope, the latter to define the FOV of the system.
Figure 1B:
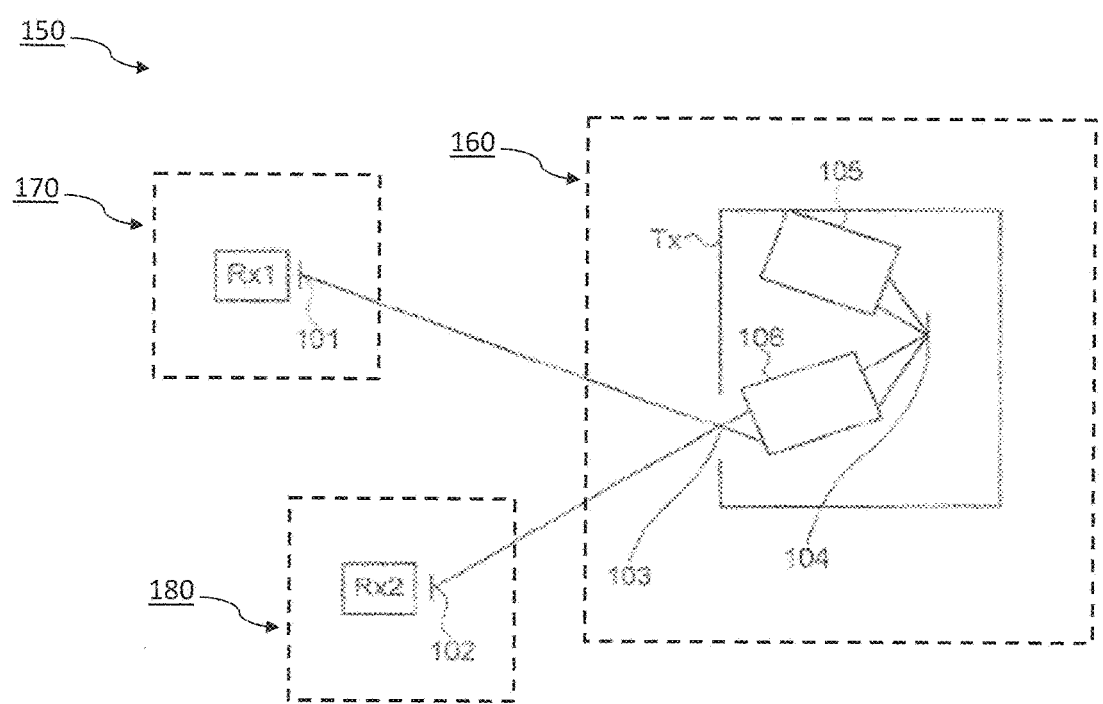
FIG. 1B shows a prior art, long laser, spatially distributed resonator system, capable of delivering power to a specific slave receiver within the FOV of the system. This system is comprised of a pair of retroreflectors (again, single cat's eye retros; not arrays), each of which defines a long laser cavity with a master transceiver, comprised, in turn, of an intracavity gain medium and an intracavity telescope, the latter to define the FOV of the system.
Figure 2:
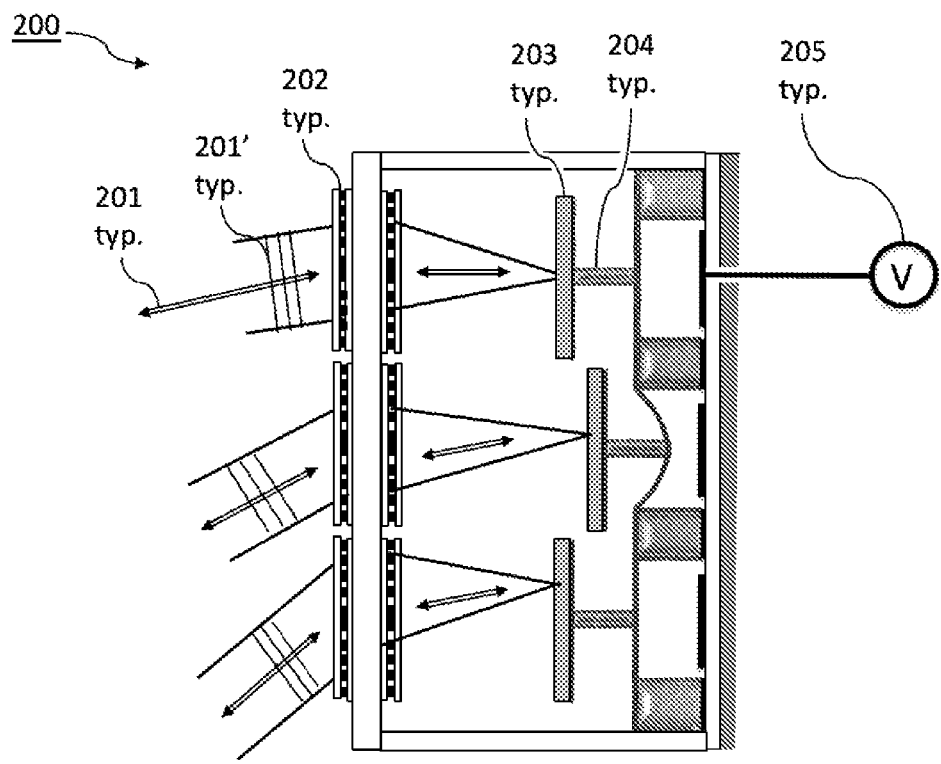
FIG. 2 shows a prior art MEMS spatial phase modulator (SPM) device, capable of imposing a controllable phase shift onto a piecewise planar incident optical beam. This device is integrated with a retroreflecting array, which, in conjunction with the phase shifting array, enables the realization of a cat's eye retroreflector array and phase control of an optical beam on a pixel-by-pixel basis (i.e., each retroreflective element in the array services a single optical phase shifting element of the MEMS SPM).

The known art, which is reviewed above (FIGS. 1A, 1B and 2), pertains to long laser systems, spatially distributed laser resonators and a spatial phase modulator with an integrated retroreflecting array, the latter which can be utilized as a phase-conjugate mirror. The known art may be of interest to the reader when reviewing this description of the present technology.

Figure 3:
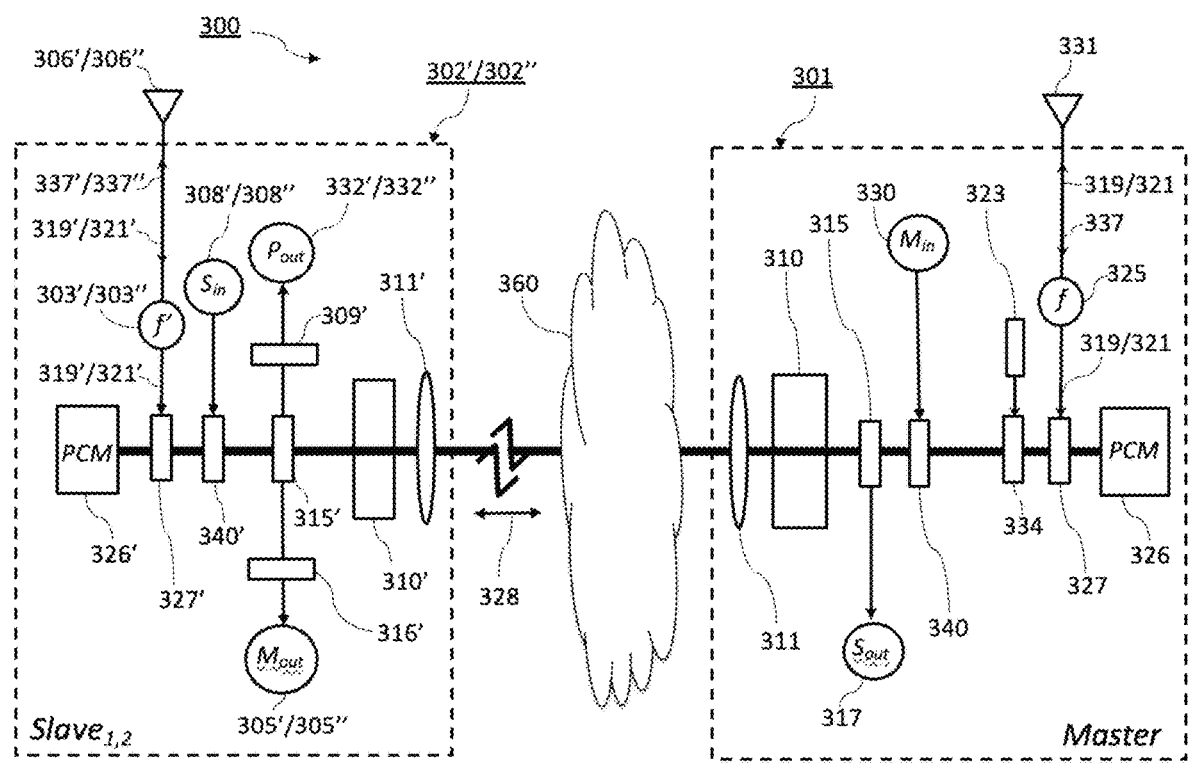
FIG. 3 shows the basic elements of an exemplary embodiment of the present invention. Depicted are the master power transceiver and one of the slave laser transceivers. A propagation distortion is shown in the intervening path between the pair of transceivers.

Turning now to FIG. 3, an exemplary embodiment of the invention is shown 300, depicting the key elements of the system symbolically represented (system details are given below in FIG. 6A and FIG. 6B). A long laser secure communications link, over a distorted optical path 360, is formed with a master ("Master") laser power transceiver module 301 at the first end of the link and one or more slave ("Slave$_{1,2}$") laser transceiver modules 302'/302" located at the second end of the link. (In general, a callout with a prime [e.g., 302'] or a double prime [e.g., 302"] depicts elements of the slave transceiver.)

The link is comprised of a long optical cavity, bounded on each end by a phase-conjugate mirror (PCM) 326/326'; an intracavity master transceiver gain medium, 310; an optional intracavity slave gain medium, 310'; and an intracavity telescope/iris, 311/311', the latter to define the field of view (FOV) of the system.

The gain media (310, 310') can be in the form of a bulk gain medium, a guided-wave medium, the latter including, but not limited to a diode-laser-pumped multimode optical fiber gain medium, a stimulated scattering gain medium (such as stimulated Raman or Brillouin scattering medium), a hollow-core, gas-filled gain medium, photonic crystal, semiconductor gain medium, etc.

The use of a PCM at each end of the resonator assures diffraction-limited operation, hence minimizing the FOV of the system and also compensates for dynamic path aberrations, 360 (e.g., atmospheric turbulence, turbid media, laser amplifier aberrations, fiber modal dispersion, intracavity distortions, beam wander, vibrations, relative platform motion, etc.), upon each pass, thereby reducing scattering, lowering the laser threshold condition, improving efficiency, and minimizing third-party detection and interception.

The long laser is also comprised of an intracavity amplitude or phase modulator 327/327' (for mode-locking); a second modulator to encode information 329/329' with a master signal 330 ($M_{in}$), and a slave signal 308'/308" ($S_{in}$); and a demodulator 315/315' to receive signals from the slave to the master 317 ($S_{out}$), and signals from the master to the slave 305'/305" ($M_{out}$), respectively. The slave transceiver also possess a photovoltaic cell 309' to derive optical power 332'/332" ($P_{out}$) from the master power laser transceiver.

The long laser is comprised of the following key elements: (1) a pair of intracavity amplitude or phase modulators, both in combination, necessary for mode-locking the long laser: modulator 327 ("first modulator," for the master unit 301) in response to signal 319/321 ("first modulating signal"), and modulator 327' ("third modulator," for the slave unit 302'/302") in response to signal 319'/321' ("third modulating signal"); (2) the following intracavity modulators to encode information onto the mode-locked beam: modulator 340 ("second modulator," for the master unit) to encode master information 330 ($M_{in}$, "second modulating signal"), and modulator 340' ("fourth modulator," for the slave unit 650) to encode slave information 308'/308" ($S_{in}$, "fourth modulating signal"); (3) an intracavity phase-shifting apparatus 334, driven by processor 323 via 338 (see FIG. 6A below); and (4) the following external photodetectors to receive signals: photodetector 317 ($S_{out}$, "first photodetector") to receive signals at the master unit, as encoded (308'/308") by the slave unit; and photodetector 305'/305" ($M_{out}$, "second photodetector") to receive signals at the slave unit, as encoded by 330 (Min) at the master unit. The slave transceiver unit also possess a photovoltaic power converter 309' to derive electrical power 332'/332" ($P_{out}$) from the master unit (301) optical beam (307'/307").

In addition, a mode-locking amplitude modulator (AM) or phase modulator (PM) is located in the Master unit 301 and, also, in the Slave units 302'/302". The function of these modulators (327, 327') is to mode-lock the long laser, for security purposes, as the specific mode-lock modulation frequency is a strong function of the optical path length between the Master and the Slave units. A wireless (rf) link between the master unit 301 and the slave units 302'/302" is utilized to set the respective frequencies (f,f'$_{1,2}$) of the AM or PM modulators (327, 327'), via rf link between 331 and 306'/306". The AM mode-locking modulator is typically utilized in the case of an inhomogeneously broadened laser gain medium; whereas, a PM mode-locking modulator is typically utilized in the case of a homogeneously broadened laser gain medium.

There are two different mode-locking modulation modalities, both highly dependent on the distance between the master and the slave transceivers (the effective long laser cavity length, nL), necessary to mode-lock the long laser. In the first mode, the frequency (f), 325, of the master AM or PM modulator, 327, is set to f=c/2 nL, where L is the length (range) of the cavity and n is the effective refractive index of the propagation path and the intracavity elements. In this first mode, only the master transceiver is modulated at f=c/2 nL. In this case, the frequencies, 303/303', of the slave transceiver modulators, 327', are set to zero (f'$_{1,2}$=0).

In the second modality (the latter case), both the master and the slave modulators (327 and 327', respectively) are modulated at a frequency (325 and 303/303', respectively) equal to c/nL (i.e., f=f'$_{1,2}$=c/nL); twice the frequency of the former case.

In both cases, the long laser becomes mode-locked, with a pulse rate equal to the respective modulation frequency (the pulse width is typically a function of the number of longitudinal modes, as is known in the art). The choice of modality is a function of the specific scenario, the presence of potential third-party detectors, and the range. The ability to mode-lock the system minimizes the probability of third party interception, as the modulation frequency is a very strong function of the specific range, or distance between the given slave and the master transceivers.

The desired Slave unit (302'/302") to be in communication with is dictated by its precise range and deterministic mode-locking frequency, as well as its presence within the FOV of the system. The FOV is dictated by the setting of the telescope/iris (311) in the master unit (301) and the telescope/iris (311') in the slave units, 302'/302". This information (range, FOV) is relayed via a rf link, coupling (331) to (306'/306"), between the master unit and the slave units.

Figure 4:
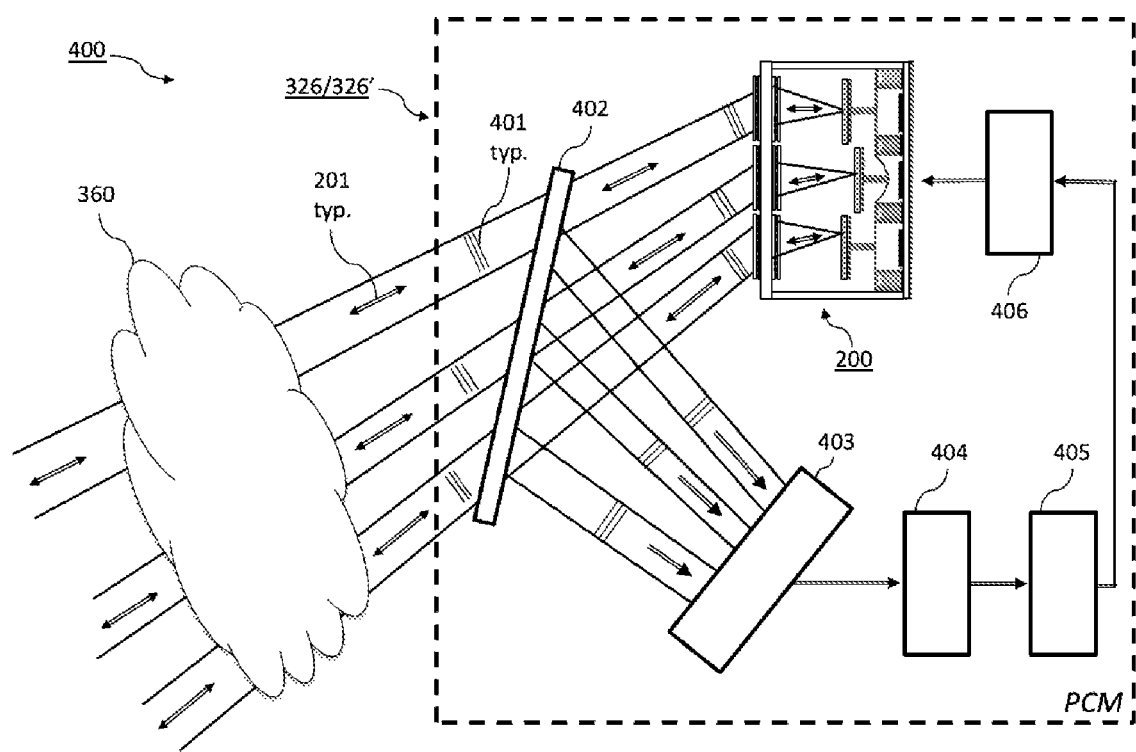
FIG. 4 shows an example of a phase-conjugate mirror (PCM) that is utilized for the master transceiver and the slave receivers. A spatial phase modulator with an integrated retroreflector array constitutes the basic PCM. A closed-loop system is comprised of a wavefront error sensor, data processor, wavefront reconstructor and drive stages that complete the servo-controlled system of the PCM. This PCM does not require an optical threshold condition to be met, it does not require coherent pump beams to initial wavefront reversal, and there is no wavelength shift between the incident beam and the wavefront revered replica. This PCM enables laser oscillation to commence using the passive retroreflecting property of the device, followed by a bootstrapping of the spatial phase modulator to initiate true wavefront reversal.

Turning now to FIG. 4, details of the PCM (326 and 326' of FIG. 3) are shown 400. The basic PCM is comprised of a spatial phase modulator (SPM) integrated with a retroreflecting array, 200, configured in an adaptive optical control (feedback) servo loop. As is known in the art, the basic servo loop is comprised of a wavefront sensor, WES, 403 (such as a Shack-Hartmann or pyramid wavefront sensor), a data processor module 404, a feedback control law processor 405 and a drive electronics module 406, the latter of which controls the phase control pixels of the PCM device, comprised of a spatial phase modulator/integrated retroreflector array 200.

It is assumed that an incident beam is distorted by path aberrations 360 (beam wander, relative platform motion, vibrations, turbulent atmosphere, laser gain distortion, fiber modal dispersion, turbid media, etc.). The distorted beam can be decomposed into an array of piecewise beamlets 201, with each beamlet described by a tilted planar wavefront 401. The distorted composite wave is incident upon the PCM device 200, where it encounters a retroreflecting array and a set of optical phase shifters (as described in FIG. 2). The retro-reflected beam from the device 200 is then incident upon a beam splitter 402, which samples the distorted beam, with a fraction of the composite beam incident upon the WES 403. The closed-loop system activates the spatial phase modulator pixels to drive the overall phase error to zero (limited by the gain of the servo system, and the spatial resolution, as is known in the art).

The PCM device performs a "bootstrapping" function. The retroreflecting array component of the device 200 initially retroreflects the incident beam at the speed of light through the device, passively compensating for tilt errors and odd-order phase errors (e.g., a pseudoconjugator operation). At the same time, and simultaneously, the closed-loop servo controls the spatial array of phase shifters, driving the remaining phase errors (even-order phase errors, etc.) to near-zero.

The result of this combined operation is that the incident beam is perfectly wavefront-inverted (limited by the gain and resolution of the system), resulting in a true wavefront reversed replica (or, "time-reversed" replica) of the incident wave. The time-reversed replica compensates for the path distortions 360 upon its reverse transit through the system. The PCM does not require an optical threshold condition to be met (not to be confused with the fundamental long-laser oscillation threshold condition, which is required), does not frequency-shift the incident beam and does not require any other laser beam to initiate operation. These characteristics are typical of a nonlinear optical PCM; the present PCM is a linear device. The PCM of FIG. 4 satisfies the requirements of the invention, in the presence of mode-locked operation.

Figure 5:
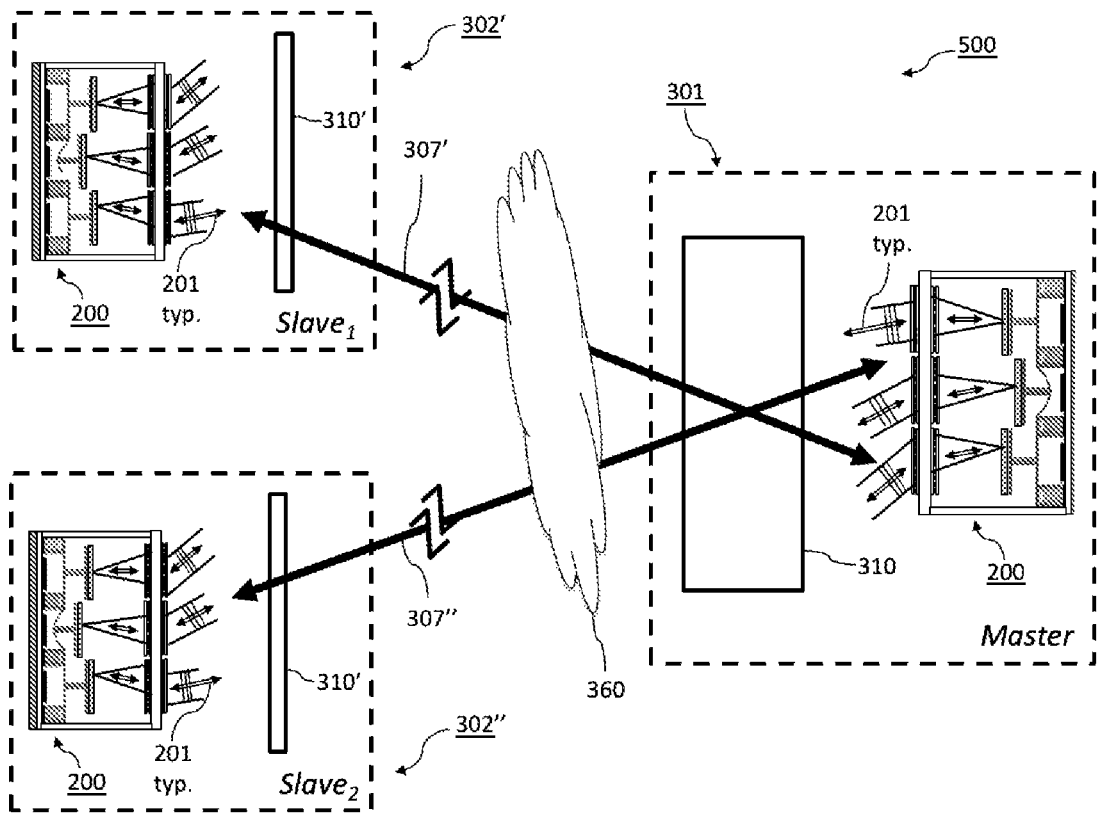
FIG. 5 shows a schematic representation of two of the basic elements of an exemplary embodiment of the present invention, comprised of a laser power transceiver and two slave transceivers (with an optional laser pre-amplifier, all equipped with a PCM, based on the description depicted in FIG. 4. A path propagation distortion region is shown, which can be a result of atmospheric turbulence, turbid water, laser amplifier distortions or thermal aberrations over the length of the cavity. For simplicity, the diagram shows only the PCM element.

Turning now to FIG. 5, a schematic 500 is shown that emphasizes the basic function of the system with PCMs at both ends of the link, in the presence of phase distortions 360 and laser amplifier (310, 310') distortions. The presence of PCMs 200 at each end of the link assures auto alignment of the system and also compensation of the path distortions 360 upon each transit of the intracavity mode 307/307' between the Master unit 301 and the Slave units 302/302', Slave$_1$ and Slave$_2$, respectively, as discussed above with respect to FIG. 4. (For simplicity, only the SPM/retroreflector array device 200 is shown in the figure.) The system also compensates for distortions in the respective laser amplifiers, 310 and 310', within the Master unit 301 and the Slave units 302'/302". As described in FIG. 4, each beamlet (or pixel) 201 that comprises the intracavity optical beams (307'/307") is retroreflected and phase-shifted, on a pixel-by-pixel basis, to compensate for path errors, resulting in a phase-conjugate, long laser resonator, with two-way path compensation, including secure transfer of power and secure communications between the master and the slave units.

Figure 6A:
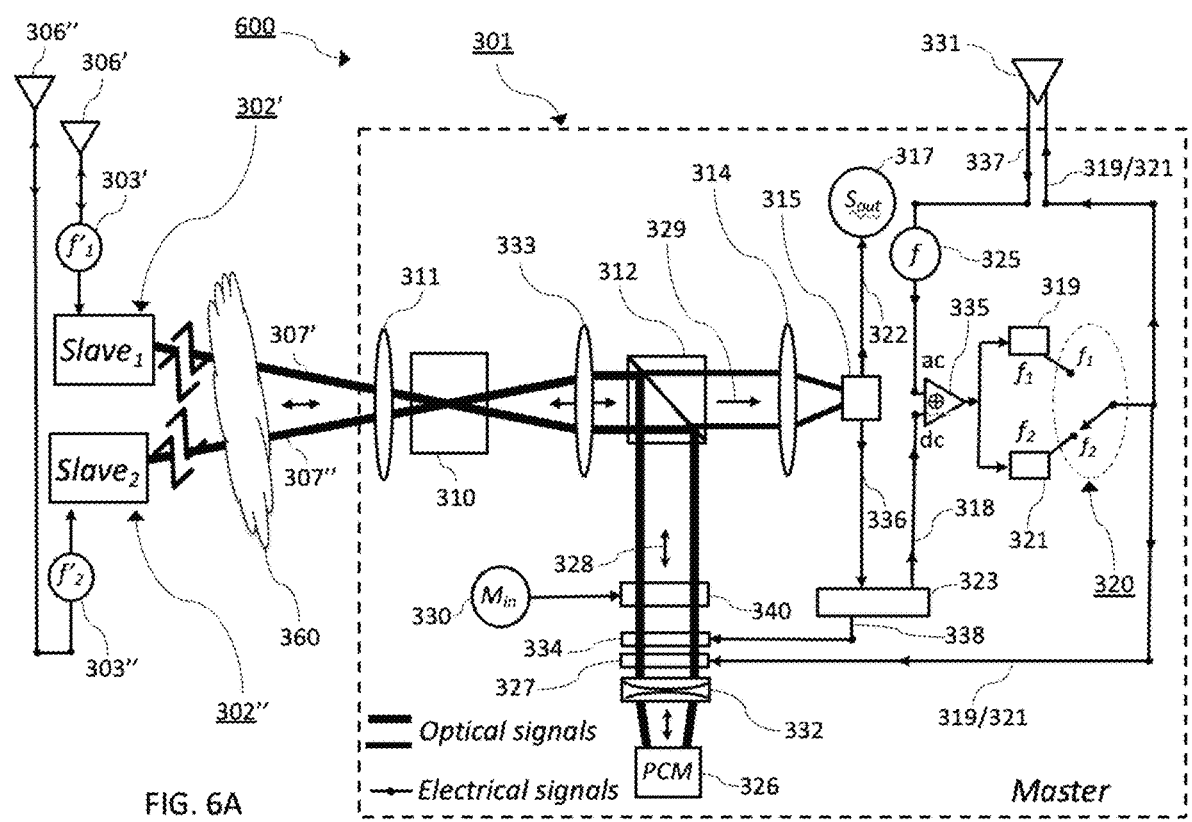
FIG. 6A shows the detailed elements of an exemplary embodiment of the present invention, depicting the elements of the master laser power module. The overall system is comprised of a pair (or more) of slave transceivers, each equipped with a PCM and an intracavity modulator. A master laser power transceiver is equipped with a PCM, an intracavity modulator, a laser power amplifier, an intracavity telescope/iris and a servo-controlled feedback loop to set the mode-locked frequency and overall phase shift that drives the modulators. A two-way encrypted rf link between the master and slave devices establishes the necessary parameters (modulation frequency, range, etc.) to initiate the communications system and power transfer operations.

Turning now to FIG. 6A, details of an exemplary embodiment 600 of the system are depicted, with emphasis on the maser laser unit 301. During operation, a long-laser resonator is formed between the master unit, 301, and one or both of the slave units, 302' and 302". (Details of the slave units are shown in FIG. 6B below.) One or both intracavity beams, 307' and/or 307" is incident upon the master laser unit, 301. The beam initially passes through a telescope/iris (311) and laser gain medium, 310, and is collimated by optical telescope 333. The telescope/iris defines the FOV of the system.

The beam encounters two paths via beam splitter 312. One path, 328, constitutes the high-power long-laser intracavity counterpropagating beam. The other path, 329, is the output signal beam from the long laser, which is incident upon beam splitter 315, resulting in signals 336 and 322. Signal 336 is imputted to processor 323. Processor 323 provides two outputs, 338 and 318. Signal 338 drives optical phase shifting apparatus 334 for proper setting of the long-laser optical path length. Signal 318 provides the "dc" input to adder 335 (to be discussed below). Signal 322 is demodulated by sensor photodetector 317 to provide the secure communication link output ($S_{out}$) from the Slave to the Master unit.

The high-power intracavity beam 328, emerging from beam splitter 312, propagates to modulator 340 which encodes Master unit communication information 330 ($M_{in}$) for transfer to the Slave unit(s), then through optical phase shifting apparatus, 334 (discussed below), and, subsequently, through modulator 327 for mode locking, and finally through-telescope 332 (typically a compound lens system, such as a telecentric), after which it encounters the PCM 326 (recall FIG. 4). The PCM generates a wavefront-reversed ("time-reversed") replica of the incident beam, with the wavefront-reversed beam counterpropagating with respect to the incident beam, retracing its path (328), reflecting from the beam splitter 312, and back through the telescopes 333 and 311, the gain medium 310 and out through the path distortion 360. The time-reversed beam "undoes" the dynamic aberrations, including propagation distortions, laser gain media distortions, optical fiber modal dispersion, etc., and terminates at the slave unit, 302' or 302" ($Slave_1$ or $Slave_2$, respectively), thereby completing the intracavity roundtrip transit and resulting in a diffraction-limited beam.

Also prior to the PCM, the beam 328 passes through modulator 334. The modulator, 334, phase-shifts the entire beam (307' or 307") by $\delta\varphi = 2\pi L\delta n/\lambda + 2\pi n\delta L/\lambda$, where $\lambda$ is the wavelength of light and L is the cavity length (range) and $\delta n$ is the electro-optical induced index of refraction (in the case of an electro-optical or liquid crystal phase shifter) and $\delta L$ is the change in length, in the case of an optical fiber phase shifter (e.g., a fiber wrapped around a PZT cylinder). The function of this phase shifter is to match the frequency to the range (path length) for mode-locked operation—that is, $f = c/[(n+\delta n)(L+\delta L)]$ or $f = c/2[(n+\delta n)(L+\delta L)]$—depending on the desired mode-locked modality, as discussed with respect to FIG. 3 above. In the former case (f~c/nL), recall that the slave transceiver also modulates the beam by $f'_{1,2} = f \sim c/nL$; whereas, in the latter case (f~c/2 nL), only the master modulates the beam at frequency f; the slave transceivers do not modulate the beam (i.e., $f'_{1,2} = 0$). The modulator driver (323) that comprises this phase shifting correction signal provides a relatively low frequency error correction signal (designated by "dc"). The error signal drives the phase shifter 334 as well as controls the mode-locked frequency via error signal 318 to adder 335.

Prior to PCM 326, the intracavity beam 328 passes through several modulators: modulator 340 (that encodes optical communication information onto the Master beam via 330, $M_{in}$), modulator 334 (that provides phase-shifting correction information), and modulator 327 (that provides the mode-locked carrier frequency). Modulator 327 is driven via 319/321 by frequency $f_1$ (via phase-locked signal generator 319) or $f_2$ (via phase-locked signal generator 321), as selected by switch 320, to mode-lock the laser for optical communication with $Slave_1$ unit (302') or $Slave_2$ unit (302") respectively, via respective optical link 307'/307". The specific optical mode-locked frequency is a function of the optical path-length from the Master PCM (326) to the Slave PCM (326'). The mode-locked frequency is dictated via the adder output (335) that sets the phased-locked loops, 319/321, at either $f_1$ or $f_2$, respectively. The adder input is comprised of two inputs: frequency 325 at f (labelled "ac"), and an error correction signal 318 (labelled "dc"). Wireless feedback information, via 306'/306", from the Slave, is received at the Master by 331 and is directed via 337 at frequency f (325), which provides the "ac" input to adder 335. The correction signal 318 (which provides the "dc" input to adder 335), is set by control processor 323, whose input information is comprised of the mode-locked laser output signal 336. Processor 323 also provides phase-shifting correction information 338 that drives optical path-length correction apparatus, 334. The adder (335) output sets the frequency generator frequency at 319 or 321, which drives the mode-lock carrier modulator 327 and, further, communicates this frequency information wirelessly via 331 to 306'/306", the latter located in the slave unit receiver 302'/302".

A wireless link couples a rf transceiver 331, located at the master unit, with a rf transceiver 306' and/or 306", located at the slave unit(s). This rf information (via signals 337 and 337'/337") is used to determine the optical path length (range) and, hence, the required mode-locked frequency, $f_1$ or $f_2$, 319/321 for the master unit 301, which modulates the high-power intracavity laser beam 328 by modulator 327 for mode locking. This information is also utilized to set the frequencies, 303' and 303" ($f'_1$ and $f'_2$, respectively) of the respective slave units 302' and 302" for mode-locking of the long-laser resonator for enhanced security.

Figure 6B:
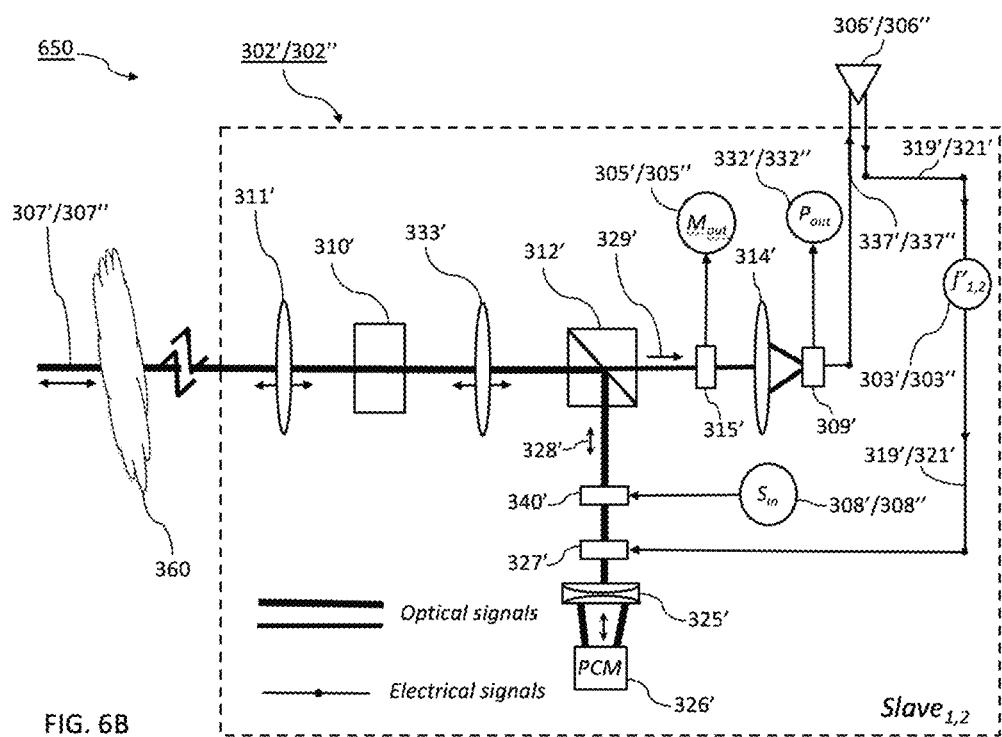
FIG. 6B shows the detailed elements of an exemplary embodiment of the present invention, depicting the elements of the slave laser transceiver, comprised of a PCM, an intracavity modulator, a detector, a photovoltaic cell, an intracavity telescope/iris and an optional laser pre-amplifier.

Turning now to FIG. 6B, details of an exemplary embodiment 650 of the system are depicted, with emphasis on the slave laser unit 302' and 302" ($Slave_1$ and $Slave_2$, respectively). As described above with respect to FIG. 6A, during operation, a long-laser resonator is formed between the master unit transceiver, 301, and one or both of the slave units, 302' and 302". One or both intracavity beams, 307' and/or 307" is incident upon the slave laser unit. The incident beam passes through a telescope/iris 311' (to control the FOV in concert with the master transceiver), optional laser gain medium, 310', and is collimated by optical telescope 333'.

The beam encounters two paths via beam splitter 312'. One path, 328', is the high-power long-laser intracavity counterpropagating beam. The other path, 329', is the output signal beam. The output signal beam 329' encounters two paths via beam splitter 315'. One component is the master transceiver secure communications link information, which is detected by sensor 305'/305", revealing the secure link information $M_{out}$. The second component of the beam 329' passes through telescope 314' after which it is detected by a photovoltaic (or equivalent) sensor 309', whose output serves two purposes: first, it provides a wireless feedback signal 337'/337" that emanates from 306'/306" for wireless rf transmit of information (e.g., mode lock parameters, range, etc.) back to the master, and, second, it provides optical-to-electrical output power, 332'/332" ($P_{out}$), as relayed from the master unit 301 (of FIG. 6A) to the slave unit (302'/302").

Returning to FIG. 6B, the intracavity counterpropagating beam 328' propagates through modulators 340' and 327' (discussed below), and through telescope 325' (e.g. a compound lens system, such as a telecentric) after which it encounters the PCM 326' (recall FIG. 4). The PCM generates a wavefront-reversed ("time-reversed") replica of the incident beam, with the wavefront-reversed beam counterpropagating with respect to the incident beam, retracing its path (328'), reflecting back through the beam splitter 312', reverse passage through the telescopes 333' and 311', the optical laser gain medium 310' and out through the path distortion 360 where the time-reversed beam "undoes" the dynamic aberrations (including turbulence, laser gain distortions, etc.), and terminating at the master unit (Master), 301, thereby completing the intracavity roundtrip transit mode. The return beam is therefore diffraction-limited, minimizing losses, minimizing the long-laser threshold, minimizing the FOV and, hence, minimizing the probability of third party interception and detection.

Returning to the intracavity beam 328': upon reflection from beam splitter 312', and prior to the PCM (326'), the beam passes through modulator 329', where it is encoded with slave transceiver secure signal information 308'/308" ($S_{in}$) for transfer to the master unit 301.

Also, prior to the PCM 326', the intracavity beam 328' passes through modulator 327'. This modulator imposes a modulation signal at frequency $f'_{1,2}$ (via signal 319'/321') to mode-lock the laser over path 307' or 307", respectively. Recall from FIG. 3, that there are two mode-locked modalities. In the first case, the master transceiver is modulated at a nominal frequency of f~c/2nL, where L is the range and where n is the effective refractive index over the path. In this case, the slave modulator frequency is set to zero, that is, $f'_{1,2}=0$. In the second case, the master unit is modulated (via 327) at a nominal frequency of f~c/nL. In this latter case, the slave unit modulator (327') is also modulated at the same frequency as that of the master unit, that is $f'_{1,2}=f_{1,2}$~c/nL. The desired modulation frequency, $f'_{1,2}$ (303'/303"), is obtained via the rf wireless link 306'/306" from 331. The wireless link also relays range information to the master unit 301 for determination of the mode-locked frequency, $f_1$, $f_2$.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated.

As an example, in some scenarios, only one PCM may be required for first end of the link, whereas a retroreflector or retroreflector array (e.g., corner cubes or cat's eyes) may be required for the second end of the link. Moreover, other classes of phase-conjugate mirrors can be implemented, including, but not limited to four-wave and three-wave mixers, Brillouin-enhanced four-wave mixers, SPMs with optical feedback as opposed to conventional wavefront sensors, photorefractive conjugators and loop conjugators. In addition to actively mode-locked modalities, passive mode-locked systems can be implemented, as well as hybrid mode-locked/Q-switched resonator configurations.

Furthermore, various classes of gain media can be implemented, such as diode-pumped single-mode and multi-mode optical fiber laser amplifiers, Raman and Brillouin gas-filled hollow-core photonic crystal fiber amplifiers, etc. Compact systems can be realized using metaoptical surfaces and elements in place of conventional optical telescopes and bulk optical trains.

Optical phase shifters such as tunable metasurface elements, single-mode and multi-mode waveguide phase shifters can be utilized, as well as metasurface optical phase shifters and other photonic devices, in place of conventional electro-optical and mechanical phase shifters (e.g., electro-optical crystals, liquid crystals, PZT-wound fiber phase shifters, etc.).

It is to be appreciated that the invention can be implemented to service a variety of beyond atmospheric compensation and adaptive optical systems. Examples include laser communication systems, compensation for telescope and microscope distortions, compact beam forming networks, guided-wave links, spectroscopy, medical applications such as optical coherence tomography and microscopy systems, robust Fabry-Perot cavities, stabilized single-mode and multi-mode lasers for compact operation, long laser concepts, remote sensing applications, LIDAR systems and laser scaling architectures. To this end, the teachings of this invention can apply to arrays of devices as well as to single-pixel SLM devices.

Similarly, when the distortion path that imposed the wave front distortions to be compensated is referred to as a dynamic atmosphere, it is to be understood that the teachings can also be applied, without loss of generality, to a correct for propagation-path distortions such as those experienced by imperfect optical elements, and static and/or dynamic distortions due to propagation through, or scattered from, ocular systems, skin tissue, clouds, turbid liquids, industrial environments, beam wander, platform motion, guided-wave distortions, and so on. The system is amenable to closed-loop and open loop optical compensation systems using, as example Shack-Hartmann and pyramid wave-front sensors.

It is also understood that the teachings herein can apply to guided-wave implementations of the present invention, given the state-of-the-art in optical fiber devices including, but not limited to, modulators, Faraday rotators and isolators, polarizers, sensors, fiber couplers and splitters, photonic crystal fibers, holey fibers, diode-pumped fiber lasers, amplifiers, Raman fiber amplifiers and MEMS devices. Fiber realizations can also be employed in place of bulk optical elements.

Furthermore, it is also to be understood that the teachings described herein can also apply to systems that operate in other regions of the electro-magnetic spectrum, from mm waves to the ultraviolet and beyond. As an example, precision compensated imaging over propagation-path distortions in the THz regime can be realized by employing appropriate THz detectors, sources, and beam forming components (THz sensors, imagers, diffraction gratings, photonic crystals, modulators, etc.) analogous to those in the optical embodiments. In addition, it is to be appreciated that the extension of the techniques taught herein can also apply to acoustic and ultrasonic beam forming systems through acoustic-based distortion paths.

The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Section 112, as it exists on the date of filing hereof, unless the element is expressly recited using the phrase "means for . . . " and no method or process step herein is to be construed under those provisions unless the step, or steps, are expressly recited using the phrase "comprising the step(s) of . . . ."

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation.

The scope of the invention is to be defined by the following claims.

What is claimed is:

1. An optical system for providing secure optical power distribution and for providing a secure two-way communications link between a master unit and at least one remote unit over a long distance, each comprising an optical phase conjugate mirror to compensate for propagation distortions, to minimize optical scattering and to provide auto-aliment of an ensemble of optical elements, and, concomitantly, comprising mode-locking of an optical cavity formed by the master unit and at least one remote unit, wherein each end of a long optical link has provisions to jointly mode-lock a cavity to further enhance a secure link with minimal third-party detection and third party interception, the combination of which improves two-way security of the communications link and security of optical power distribution between said master unit and at least one said remote unit, comprising, in combination:

a first optical phase conjugate mirror;

a second optical phase conjugate mirror remotely disposed from, and aligned with, said first optical phase conjugate mirror, said first optical phase conjugate mirror and second optical phase conjugate mirrors defining a pair of ends of an optical cavity over a distance, said optical cavity providing an output optical beam;

a first modulator disposed adjacent to said first optical phase conjugate mirror and disposed within said optical cavity, said first modulator responding to a first modulating signal resulting in a mode-locked said output optical beam of said optical cavity;

an optical phase shifting apparatus disposed adjacent to said first modulator and disposed within said optical cavity, for optimizing said mode-locked output optical beam of said optical cavity;

a second modulator disposed adjacent to said optical phase shifting apparatus and disposed within said optical cavity, said second modulator encoding said output optical beam of said optical cavity in response to a second modulating signal;

a first laser amplifier disposed adjacent to said second modulator and disposed within said optical cavity;

a first optical telescope and a first aperture disposed between said first laser amplifier and said second modulator and disposed within said optical cavity for controlling a field of view of said optical cavity;

a third modulator disposed adjacent to said second optical phase conjugate mirror and disposed within said optical cavity, said third modulator providing a third modulating signal resulting in a mode-locked said output optical beam of said optical cavity in response to a third modulating signal;

a fourth modulator disposed adjacent to said third modulator and disposed within said optical cavity, said fourth modulator encoding said output optical beam of said optical cavity in response to a fourth modulating signal;

a second laser amplifier disposed adjacent to said fourth modulator and disposed within said optical cavity, a combined gain of said first laser amplifier and second laser amplifier being at least sufficient to sustain laser oscillation within said optical cavity;

a second optical telescope and a second aperture disposed between said second laser amplifier and said fourth modulator and disposed within said optical cavity for controlling a field of view of the said optical cavity;

a first photodetector disposed external to said optical cavity, in response to said fourth modulating signal;

a second photodetector disposed external to said optical cavity, in response to said second modulating signal; and a photovoltaic power converter disposed external to said optical cavity and adjacent to second photodetector, for converting said output optical beam to electricity.

2. The optical system according to claim 1, wherein said output optical beam of said optical cavity comprises a first servo-controller to adjust said first modulation signal to optimize said mode-locked output optical beam of said optical cavity.

3. The optical system according to claim 1, wherein said output optical beam of said optical cavity further comprises a second servo-controller to adjust the said optical phase shifting apparatus to optimize said mode-locked output optical beam of said optical cavity.

4. The optical system according to claim 1, wherein said first modulator is modulated at a frequency equal to the reciprocal of a round-trip photon transit time within said optical cavity, and wherein said third modulator is modulated at zero frequency.

5. The optical system according to claim 1, wherein said first modulator and said third modulator are each modulated at a frequency equal to the reciprocal of a single-pass photon transit time within said optical cavity.

6. The optical system according to claim 1, wherein said first modulator is a phase modulator (PM).

7. The optical system according to claim 1, wherein said first modulator is an amplitude modulator (AM).

8. The optical system according to claim 1, wherein said third modulator is a phase modulator (PM).

9. The optical system according to claim 1, wherein said third modulator is an amplitude modulator (AM).

10. The optical system according to claim 1, wherein said optical phase shifting apparatus is comprised of an electro-optical element.

11. The optical system according to claim 1, wherein said optical phase shifting apparatus is comprised of an optical fiber controlled by a PZT element.

12. The optical system according to claim 1, wherein said laser amplifier is comprised of a semiconductor.

13. The optical system according to claim 1, wherein said laser amplifier is comprised of a diode-pumped optical fiber.

14. A wireless link that establishes a secure duplex communications channel between a pair of ends of an optical cavity, comprised of a master unit and at least one remote unit, over a long distance, for providing secure optical power distribution and for providing a secure two-way communications link, each end comprising an optical phase conjugate mirror to compensate for propagation distortions, to minimize optical scattering and to provide auto-aliment of an ensemble of optical elements, and, concomitantly, comprising mode-locking of said optical cavity formed by said master unit and at least one remote unit to further assure a secure link with minimal third-party detection and third party interception, the combination of which improves two-way security of a secure communications channel and security of optical power distribution between said master unit and at least one said remote unit, comprising, in combination:
   a first optical phase conjugate mirror;
   a second optical phase conjugate mirror remotely disposed from, and aligned with, said first optical phase conjugate mirror, said first optical phase conjugate mirror and second optical phase conjugate mirrors defining a pair of ends of an optical cavity over a distance, said optical cavity providing an output optical beam;
   a first modulator disposed adjacent to said first optical phase conjugate mirror and disposed within said optical cavity, said first modulator responding to a first modulating signal resulting in a mode-locked said output optical beam of said optical cavity;
   an optical phase shifting apparatus disposed adjacent to said first modulator and disposed within said optical cavity, for optimizing said mode-locked output optical beam of said optical cavity;
   a second modulator disposed adjacent to said optical phase shifting apparatus and disposed within said optical cavity, said second modulator encoding said output optical beam of said optical cavity in response to a second modulating signal;
   a first laser amplifier disposed adjacent to said second modulator and disposed within said optical cavity;
   a first optical telescope and a first aperture disposed between said first laser amplifier and said second modulator and disposed within said optical cavity for controlling a field of view of said optical cavity;
   a third modulator disposed adjacent to said second optical phase conjugate mirror and disposed within said optical cavity, said third modulator providing a third modulating signal resulting in a mode-locked said output optical beam of said optical cavity in response to a third modulating signal;
   a fourth modulator disposed adjacent to said third modulator and disposed within said optical cavity, said fourth modulator encoding said output optical beam of said optical cavity in response to a fourth modulating signal;
   a second laser amplifier disposed adjacent to said fourth modulator and disposed within said optical cavity, a combined gain of said first laser amplifier and second laser amplifier being at least sufficient to sustain laser oscillation within said optical cavity;
   a second optical telescope and a second aperture disposed between said second laser amplifier and said fourth modulator and disposed within said optical cavity for controlling a field of view of the said optical cavity;
   a first photodetector disposed external to said optical cavity, in response to said fourth modulating signal;
   a second photodetector disposed external to said optical cavity, in response to said second modulating signal;
   a photovoltaic power converter disposed external to said optical cavity and adjacent to said second photodetector, for converting said output optical beam to electricity; and
   a wireless link that establishes a secure duplex communications channel between said first optical phase conjugate mirror and said second optical phase conjugate mirror.

15. The wireless link according to claim 14, wherein said wireless link communicates a set of secure communication protocols over a distance between said first optical phase conjugate mirror and said second optical phase conjugate mirror and further, communicates signals to at least control said first modulator and said third modulator resulting in a mode-locked output optical beam of said optical cavity.

16. An optical system for distributing optical power and for establishing a secure two-way communications link between a master unit and at least one remote unit, each comprising an optical phase conjugate mirror to compensate for propagation distortions, to minimize optical scattering and to provide auto-aliment of an ensemble of optical elements. wherein each optical phase conjugate mirror is self-starting with essentially zero threshold requirements, employing retro-arrays for "bootstrapping" initiation in a closed-loop adaptive optical geometry and, further, comprising mode-locking of an optical cavity formed by a master unit and at least one remote unit, with cooperative mode-locking by imposing at least one modulation signal onto at least one respective intracavity beam at a respective end of an optical resonator, to establish a secure optical link with minimal third-party detection and third party interception, and, moreover, a secure duplex wireless communications link between a first optical phase conjugate mirror and a second optical phase conjugate mirror to set an ensemble of parameters for the optical link, a sum total combination of which enhances a security of the two-way communications link as well as a security of optical power distribution between the master unit and at least one remote unit, comprising, in combination:
   a first optical phase conjugate mirror;
   a second optical phase conjugate mirror remotely disposed from, and aligned with, said first optical phase conjugate mirror, said first optical phase conjugate mirror and second optical phase conjugate mirrors defining a pair of ends of an optical cavity over a distance, said optical cavity providing an output optical beam;
   a first modulator disposed adjacent to said first optical phase conjugate mirror and disposed within said optical cavity, said first modulator responding to a first modulating signal, resulting in modulation of optical cavity modes;
   an optical phase shifting apparatus disposed adjacent to said first modulator and disposed within said optical cavity, for optimizing a mode-locked output optical beam of said optical cavity;
   a second modulator disposed adjacent to said optical phase shifting apparatus and disposed within said optical cavity, said second modulator encoding said output optical beam of said optical cavity in response to a second modulating signal;

a first laser amplifier disposed adjacent to said second modulator and disposed within said optical cavity:

a first optical telescope and a first aperture disposed between said first laser amplifier and said second modulator and disposed within said optical cavity for controlling a field of view of said optical cavity;

a third modulator disposed adjacent to said second optical phase conjugate mirror and disposed within said optical cavity, said third modulator providing a third modulating signal, resulting in a mode-locked said output optical beam of said optical cavity in response to a third modulating signal;

a fourth modulator disposed adjacent to said third modulator and disposed within said optical cavity, said fourth modulator encoding said output optical beam of said optical cavity in response to a fourth modulating signal;

a second laser amplifier disposed adjacent to said fourth modulator and disposed within said optical cavity, a combined gain of said first laser amplifier and said second laser amplifier being at least sufficient to sustain laser oscillation within said optical cavity;

a second optical telescope and a second aperture disposed between said second laser amplifier and said fourth modulator and disposed within said optical cavity for controlling a field of view of the said optical cavity;

a first photodetector disposed external to said optical cavity, in response to said fourth modulating signal;

a second photodetector disposed external to said optical cavity, in response to said second modulating signal;

a photovoltaic power converter disposed external to said optical cavity and adjacent to second photodetector, for converting said output optical beam to electricity; and a wireless link that establishes a secure duplex communications channel between said first optical phase conjugate mirror and second optical phase conjugate mirror.

17. The optical system according to claim 16, wherein said first optical phase conjugate mirror is comprised of a first retroreflecting array to initiate laser oscillation, integrated with a first spatial phase modulator (SPM), on a pixel-by-pixel basis, said first spatial phase modulator is comprised of a first array of MEMS continuously moveable planar piston segments that simultaneously impart a controllable, continuous spatial phase shift onto a first incident optical beam, on a pixel-by-pixel basis.

18. The optical system according to claim 17, wherein said first spatial phase modulator (SPM) is configured in a closed-loop, servo-controlled adaptive optical system for efficient wavefront reversal of said first incident optical beam, simultaneous with said first retroreflecting array, on a pixel-by-pixel basis.

19. The optical system according to claim 16, wherein said second optical phase conjugate mirror is comprised of a second retroreflecting array to initiate laser oscillation, integrated with a second spatial phase modulator (SPM), on a pixel-by-pixel basis, said second spatial phase modulator is comprised of a second array of MEMS continuously moveable planar piston segments that simultaneously impart a controllable, continuous spatial phase shift onto a second incident optical beam, on a pixel-by-pixel basis.

20. The optical system according to claim 19, wherein said second spatial phase modulator (SPM) is configured in a closed-loop, servo-controlled adaptive optical system for efficient wavefront reversal of said second incident optical beam, simultaneous with said second retroreflecting array, on a pixel-by-pixel basis.

* * * * *